US012534363B2

(12) United States Patent
Christensen et al.

(10) Patent No.: US 12,534,363 B2
(45) Date of Patent: Jan. 27, 2026

(54) FUEL ADDITIVES FOR STORAGE AND RAPID GENERATION OF HYDROGEN

(71) Applicant: Alliance for Sustainable Energy, LLC, Golden, CO (US)

(72) Inventors: Steven Thomas Christensen, Golden, CO (US); Nicholas Allan Strange, Campbell, CA (US); Kurt Michael Van Allsburg, Denver, CO (US); Noemie Leick-Marius, Boulder, CO (US)

(73) Assignee: Alliance for Energy Innovation, LLC, Golden, CO (US)

( * ) Notice: Subject to any disclaimer, the term of this patent is extended or adjusted under 35 U.S.C. 154(b) by 693 days.

(21) Appl. No.: 17/655,901

(22) Filed: Mar. 22, 2022

(65) Prior Publication Data

US 2022/0298011 A1   Sep. 22, 2022

Related U.S. Application Data

(60) Provisional application No. 63/164,365, filed on Mar. 22, 2021.

(51) Int. Cl.
*C01B 3/00* (2006.01)
*C10L 1/12* (2006.01)

(52) U.S. Cl.
CPC .......... *C01B 3/0031* (2013.01); *C10L 1/1266* (2013.01); *C10L 2200/0277* (2013.01)

(58) Field of Classification Search
None
See application file for complete search history.

(56) References Cited

U.S. PATENT DOCUMENTS

| 4,341,651 A * | 7/1982 | Beckert ................ C01B 3/00 423/658.2 |
| 8,454,855 B1 * | 6/2013 | Bailey ................ C01B 21/0923 252/182.34 |

FOREIGN PATENT DOCUMENTS

CN    103641066    *    3/2014

OTHER PUBLICATIONS

Leick, Noemi et al. "Al2O3 Atomic Layer Deposition on Nanostructured gamma-Mg(BH4)2 for H2 Storage". ACS Applied Energy Materials. ACS. 4. 1150-1162 (2021) (Year: 2021).*
Beattie, S.D. et al., "Thermal desorption of hydrogen from magnesium hydride (MgH2): an in situ microscopy study by environmental SEM and TEM," Elsevier International Journal of Hydrogen Energy, vol. 26, 2011, 8 pages.
Dimitrievska, M. et al., "Structure-dependent vibrational dynamics of Mg(BH4)2 polymorphs probed with neutron vibrational spectroscopy and first-principles calculations," RSC Phys. Chem. Chem. Phys., vol. 18, 2016, 7 pages.
Dutczak, J., "Liquefied and chemical hydrogen storage in contemporary small drones' fuel cell propulsion systems," IOP Conference Series: Materials Science and Engineering, vol. 421, 2018, 10 pages.
Filinchuk, Y. et al., Porous and Dense Magnesium Borohydride Frameworks: Synthesis, Stability, and Reversible Absorption of Guest Species, Wiley Communications, Angew. Chem. Int. Ed., vol. 50, 2011, 5 pages.
Gross, K.J. et al., "The effects of titanium precursors on hydriding properties of alanates," Journal of Alloys and Compounds, 2003, 6 pages.
Herley, P.J. et al., "Transmission Electron Microscopy of Beam-sensitive Metal Hydrides," Zeitschnft für Physikalische Chemie Neue Folge, Bd, 147, 1986, presented at the International Symposium on "Hydrogen in Metals," Queen's University of Belfast, Northern Ireland, Mar. 26-29, 1985;13 pages.
Hino, S. et al., "Halide Substitution in Magnesium Borohydride," Journal of Physical Chemistry C, vol. 116, 2012, 7 pages.
Hügle, T. et al., "Hydrazine Borane: A Promising Hydrogen Storage Material," Journal of American Chemical Society, vol. 131, 2009, 3 pages.
Huot, J. et al., "Mechanically alloyed metal hydride systems," Applied Physics A, vol. 72, 2001, 9 pages.
Leick, N. et al., "Al2O3 Atomic Layer Deposition on Nanostructured γ-Mg(BH4)2 for H2 Storage," ACS Applied Energy Materials, vol. 4, 2021, 13 pages.
Li, H-W et al., Formation of an intermediate compound with a B12H12 cluster: experimental and theoretical studies on magnesium borohydride Mg(BH4)2, IOP Nanotechnology, vol. 20, 2009, 7 pages.
Li, J. et al., "Advanced SEM and TEM Techniques Applied in Mg-Based Hydrogen Storage Research," Wiley, Hindawi Scanning, vol. 2018, Article ID 6057496, 2018, 12 pages.
Newhouse, R.J. et al., "Reversibility and Improved Hydrogen Release of Magnesium Borohydride," J. Phys. Chem. C, vol. 114, 2010, 9 pages.
Oelerich, W. et al., "Metal oxides as catalysts for improved hydrogen sorption in nanocrystalline Mg-based materials," Elsevier Journal of Alloys and Compounds, vol. 315, 2001, 6 pages.
Paterson, W.G. et al., "The Interaction of Hydrazine With Boron and Aluminum Halides," Canadian Journal of Chemistry, vol. 41, 1963, 5 pages.
Rusman, N.A.A. et al., "A review on the current progress of metal hydrides material for solid-state hydrogen storage applications," Elsevier International Journal of Hydrogen Energy, vol. 41, 2016, 19 pages.

(Continued)

*Primary Examiner* — Sheng H Davis
(74) *Attorney, Agent, or Firm* — Neal S. Vickery

(57) ABSTRACT

Described herein are compositions and methods for the chemical storage and release of hydrogen gas. The described compositions may be useful as fuel additives for hydrogen consuming applications, including aviation. The provided compositions are flexible and can be tailored to be lightweight, have high energy capacity, have various methods of activation and rapidly release the stored hydrogen.

15 Claims, 17 Drawing Sheets

(56) References Cited

OTHER PUBLICATIONS

Saldan, I., "Decomposition and formation of magnesium borohydride," Elsevier International Journal of Hydrogen Energy, vol. 41, 2016, 24 pages.

Schneemann, A. et al., "Nanostructured Metal Hydrides for Hydrogen Storage," ACS Chemical Reviews, vol. 118, 2018, 65 pages.

Schneemann, A. et al., Nanoconfinement of Molecular Magnesium Borohydride Captured in a Bipyridine-Functionalized Metal-Organic Framework, ACS Nano, vol. 14, 2020, 11 pages.

Severa, G. et al., "Direct hydrogenation of magnesium boride to magnesium borohydride: demonstration of >11 weight percent reversible hydrogen storage," ChemComm, vol. 46, 2010, 3 pages.

Soloveichik, G. L. et al., "Magnesium borohydride as a hydrogen storage material: Properties and dehydrogenation pathway of unsolvated Mg(BH4)2," Elsevier International Journal of Hydrogen Energy, vol. 34, 2009, 13 pages.

Wang, X. et al., "The dehydrogenation kinetics and reversibility improvements of Mg(BH4)2 doped with Ti nano-particles under mild conditions," Elsevier International Journal of Hydrogen Energy, vol. 46, 2021, 11 pages.

White, J.L. et al., "Melting of Magnesium Borohydride under High Hydrogen Pressure: Thermodynamic Stability and Effects of Nanoconfinement," Chemistry of Materials, vol. 32, 2020, 12 pages.

Yartys, V.A. et al., "Magnesium based materials for hydrogen based energy storage: Past, present and future," Elsevier International Journal of Hydrogen Energy, vol. 44, 2019, 51 pages.

Zavorotynska, O. et al., "Combined X-ray and Raman Studies on the Effect of Cobalt Additives on the Decomposition of Magnesium Borohydride," Energies, vol. 8, 2015, 18 pages.

Zavorotynska, O. et al., "Recent progress in magnesium borohydride Mg(BH4)2: Fundamentals and applications for energy storage," Elsevier International Journal of Hydrogen Energy, vol. 41, 2016, 17 pages.

Zhang, Z.G. et al., "Thermal decomposition behaviors of magnesium borohydride doped with metal fluoride additives," Elsevier Thermochimica Acta, vol. 560, 2013 7 pages.

* cited by examiner

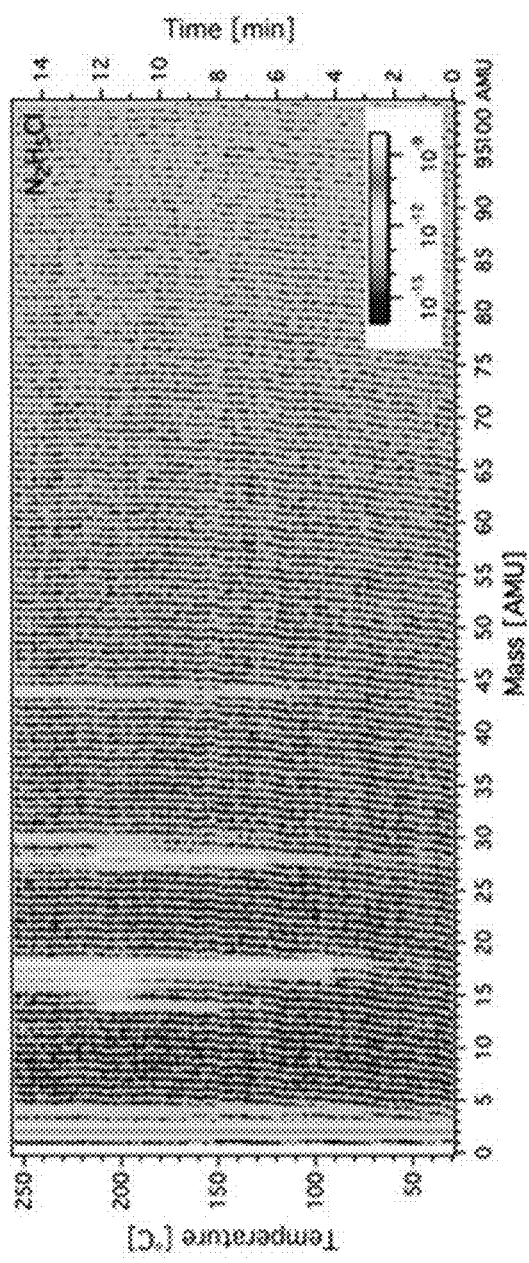
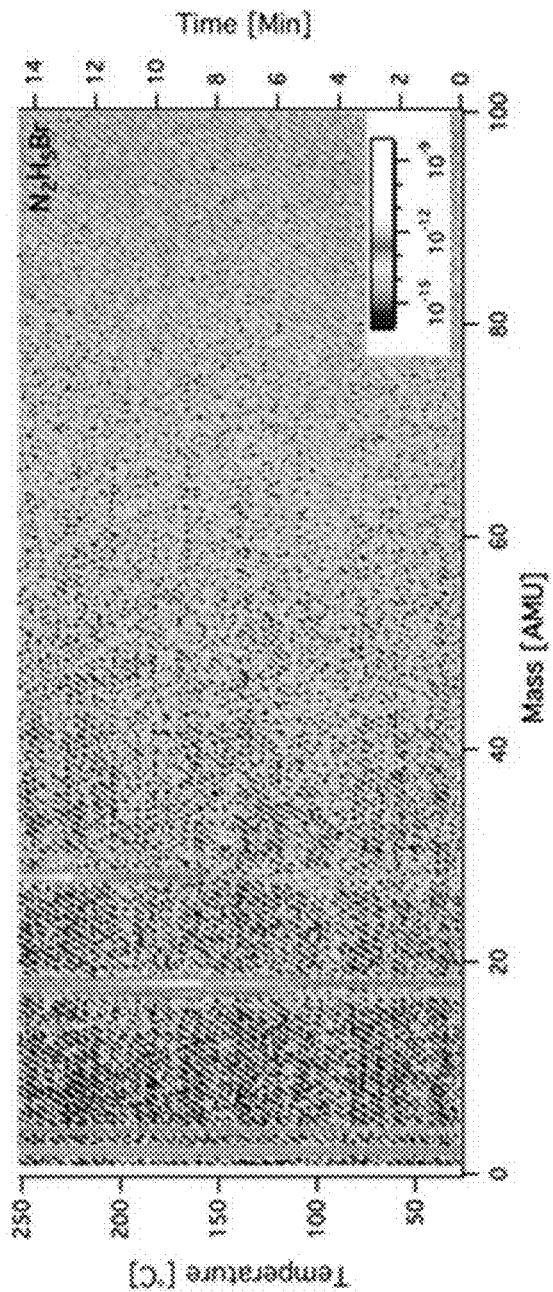
Fig. 16A
Fig. 16B

FUEL ADDITIVES FOR STORAGE AND RAPID GENERATION OF HYDROGEN

CROSS-REFERENCE TO RELATED APPLICATIONS

This application claims priority from U.S. Provisional Patent Application No. 63/164,365 filed on Mar. 22, 2022, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

SUMMARY

Described herein are compositions and methods for the chemical storage and release of hydrogen gas. The described compositions may be useful as fuel additives for hydrogen consuming applications, including aviation. The provided compositions are flexible and can be tailored to be lightweight, have high energy capacity, have various methods of activation, and rapidly release the stored hydrogen.

In an aspect, provided is a composition for storing and delivering hydrogen comprising: a substrate comprising at least one of a borohydride or an alkali aluminum hydride; and a first coating in physical communication with the substrate, wherein: the first coating comprises a hydrazinium halide having the formula $N_2H_5X$, X comprises a halogen, and the composition is capable of generating hydrogen ($H_2$) when treated with at least one of an elevated temperature, exposure to light, or exposure to electrical energy. In an aspect, the substrate and coating combine to form magnesium hydrazinidoborane ($Mg(N_2H_3BH_3)_2$).

The substrate may be a metal borohydride comprising: $NaBH_4$, $LiBH_4$, $Mg(BH_4)_2$, $Y(BH_4)_3$, $Be(BH_4)_2$, or $Ca(BH_4)_2$. The substrate may be a borohydride comprising: $(CH_3)_4CNH_3BH_4$, $CH_3NH_3BH_4$, $NH_4BH_4$ or a solid borane ($B_xH_y$). The substrate may be an alkali aluminum hydride comprising: $LiAlH_4$, $Li_2AlH_6$, $NaAlH_4$ or $Na_2AlH_6$. The halide (X) may be Br or Cl.

The composition may be capable of generating hydrogen ($H_2$) when exposed to light and the composition further comprises a light-absorbing material. The light-absorbing material may comprise at least one of a nitride or gold. The light absorbing material may be randomly mixed within the substrate or the first coating. The light absorbing-material may be present as a second coating in physical communication with the first coating. The light-absorbing material and the coating may be at a ratio between about 1:10 and about 1:100. The light-absorbing material may be cable of absorbing light having a wavelength between about 300 nm and about 1200 nm, or between 300 nm and 1200 nm. The light-absorbing material may comprise a composition defined by $A_xN_{1-x}$, N is nitrogen, A comprises at least one of titanium, zirconium, or niobium, and $0 \le x \le 1$.

The composition may be capable of generating hydrogen ($H_2$) when heated to a temperature and the temperature is selected from the range of 1° C. to 500° C., 50° C. to 450° C., 50° C. to 350° C., or optionally, 80° C. to 250° C. The composition may be capable of generating hydrogen ($H_2$) when exposed to electrical energy via direct electrical contact or electrochemical current generation.

The composition may be a liquid at temperatures less than or equal to 200° C., 100° C., 90° C., or optionally, 80° C. The liquid may be generated via melting or dissolving in solution. The composition may be a fuel additive. The substrate may be reusable by reapplying the coating after hydrogen has been generated.

In an aspect, provided is a method for storing and delivering hydrogen comprising: providing a borohydride or an alkali aluminum hydride substrate; applying a first coating comprising a hydrazinium halide and having the formula $N_2H_5X$, wherein X is F, Cl, Br or I, thereby generating a hydrogen storage composition; wherein the hydrogen storage composition is capable of generating hydrogen ($H_2$) when treat to at least one of an elevated temperature, exposure to light or exposure to electrical energy.

The step of applying a coating may comprise depositing a mixture of hydrazine and a borohalide, thereby generating a hydrazinium halide. The borohalide may be boron trifluoride, boron trichloride, boron tribromide or boron triiodide.

The step of applying may comprise mechanical mixing of substrate and the coating. The step of applying may comprise using physical vapor deposition to apply the coating to the substrate, for example, atomic layer deposition. The step of applying may comprise using solution chemistry to apply the coating to the substrate.

The method may further comprise generating hydrogen gas by exposing the hydrogen containing composition to an elevated temperature, light or electrical energy.

BRIEF DESCRIPTION OF DRAWINGS

Some embodiments are illustrated in referenced figures of the drawings. It is intended that the embodiments and figures disclosed herein are to be considered illustrative rather than limiting.

FIGS. 16A-16B illustrate control measurements for N$_2$H$_5$X, showing decomposition at 200° C.

DETAILED DESCRIPTION

Figure 1:
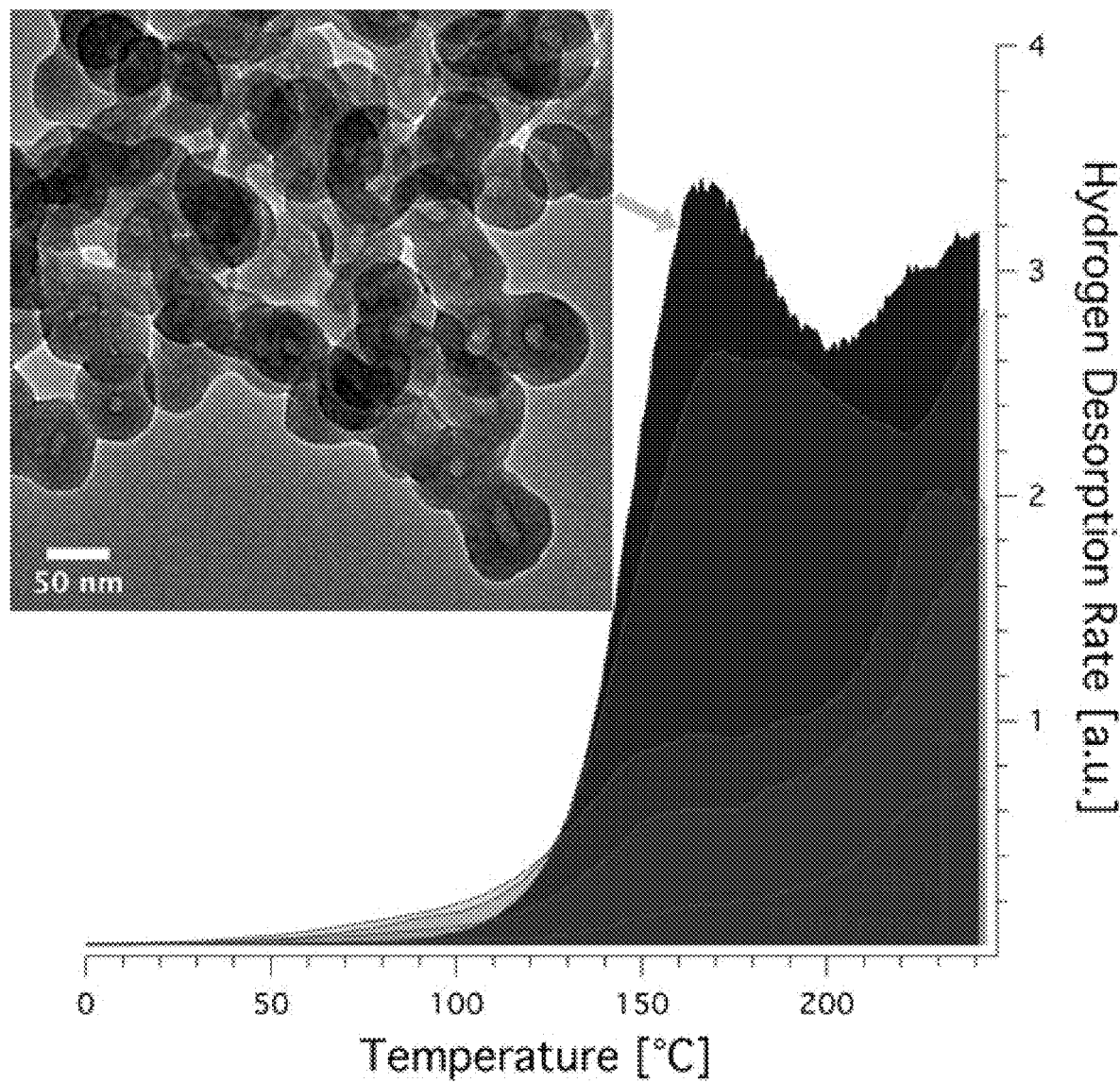
FIG. 1 provides a TEM image of $Mg(BH_4)_2$ coated with 100 cycles of ALD $Al_2O_3$ (~10 nm): $(CH_3)_3Al + H_2O = 1$ ALD 'cycle' Temperature programmed desorption (TPD) for increasing coating thickness: rate peaks for 100 cycle-thick coating. An example of atomic layer deposition (ALD) of coatings to improve $Mg(BH_4)_2$ hydrogen cyclability. ALD of $Al_2O_3$ improved $H_2$ desorption rate by not cyclability.
Figure 2:
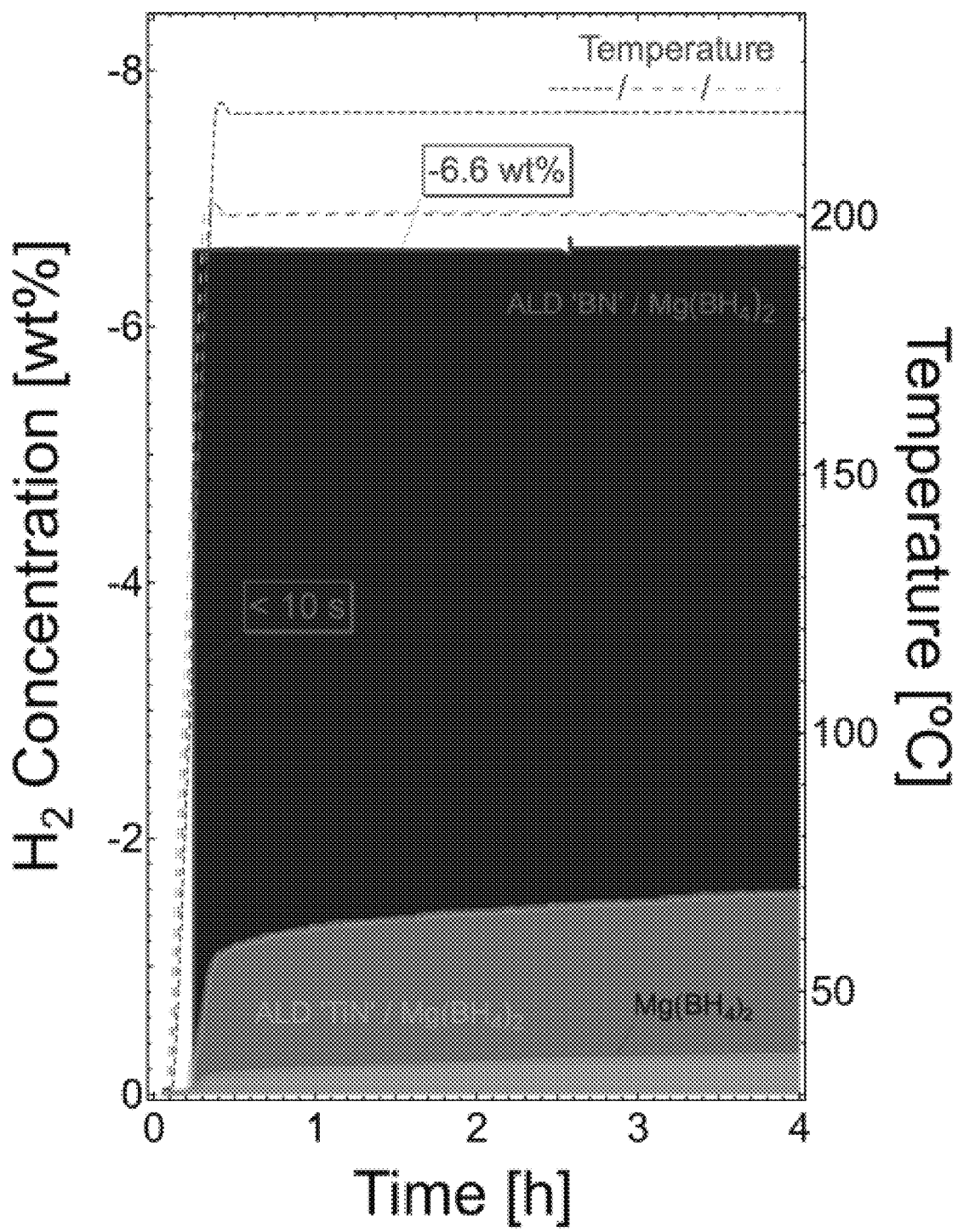
FIG. 2 illustrates hydrogen desorption of BN and TiN. BN showed rapid desorption, 6.6 wt % Hydrogen desorbed from boron nitride (BN) coated $Mg(BH_4)_2$ in less than 10 s. TiN also showed enhanced desorption.
Figure 3:
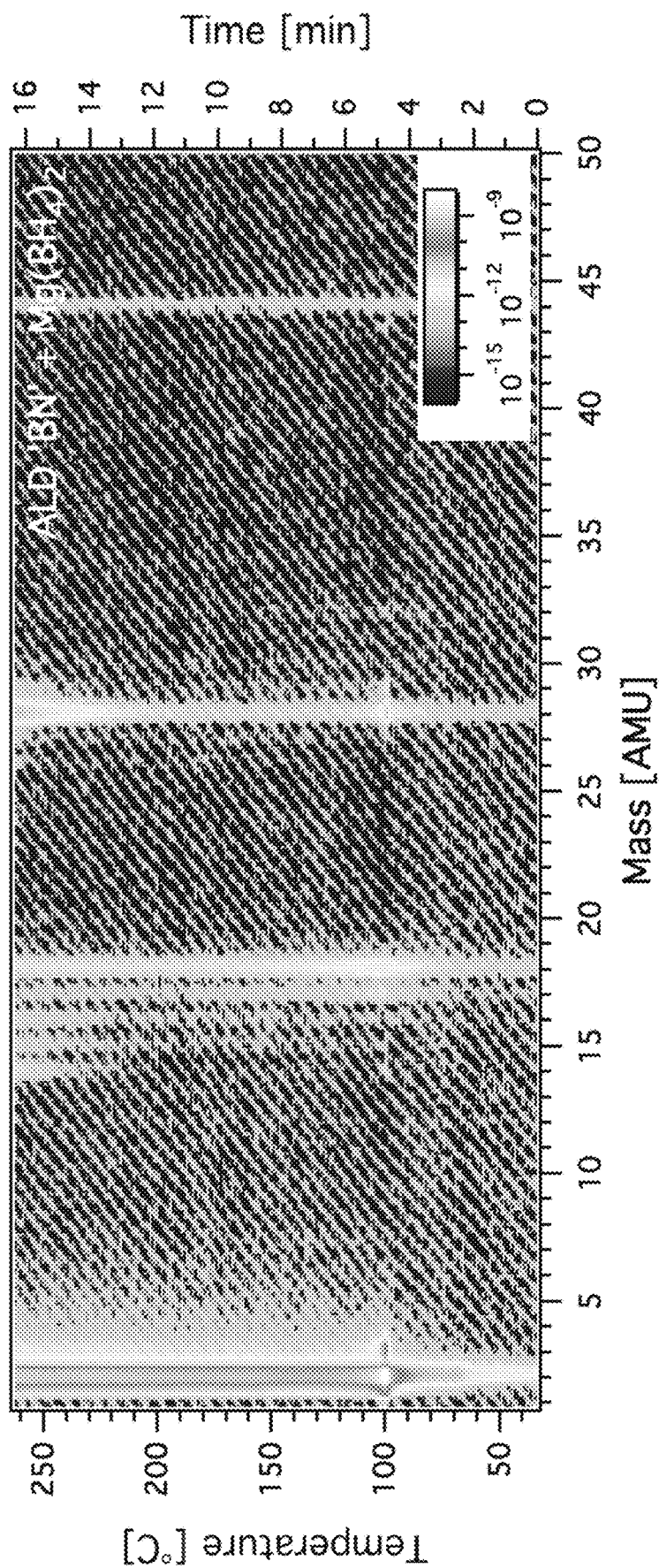
FIG. 3 illustrates ALD BN gives clean $H_2$ at low temperatures (100° C.). Other products begin to form at temperatures greater than 200° C., including $NH_3$, $N_2$ and trace $B_2H_6$.
Figure 4:
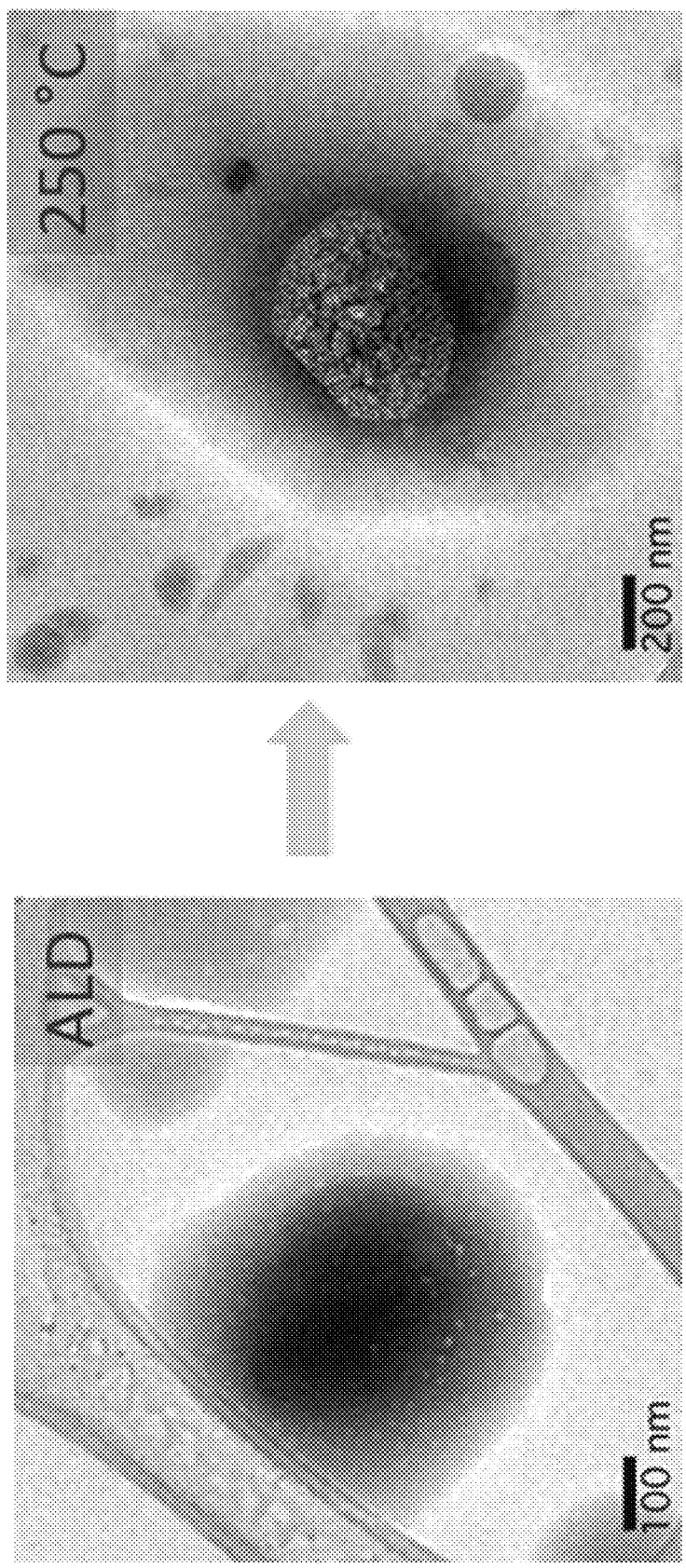
FIG. 4 illustrates a characterization of the described mechanism.
Figure 5:
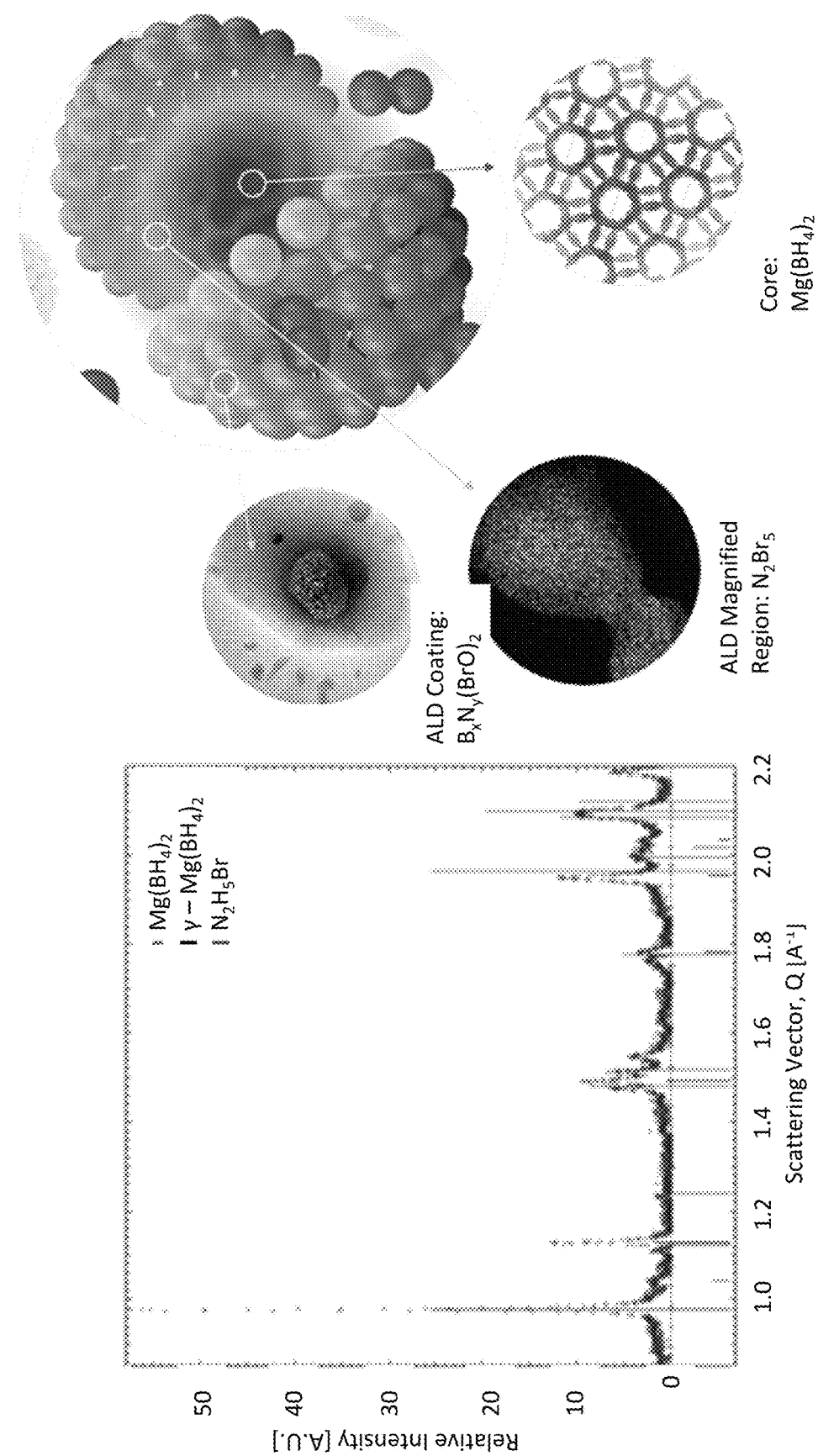
FIG. 5 illustrates the three part chemical composition for the coating, modified region and borohydride core. This was determined by multiple characterization methods including x-ray diffraction (shown, left) showing hydrazinium bromide.
Figure 6:
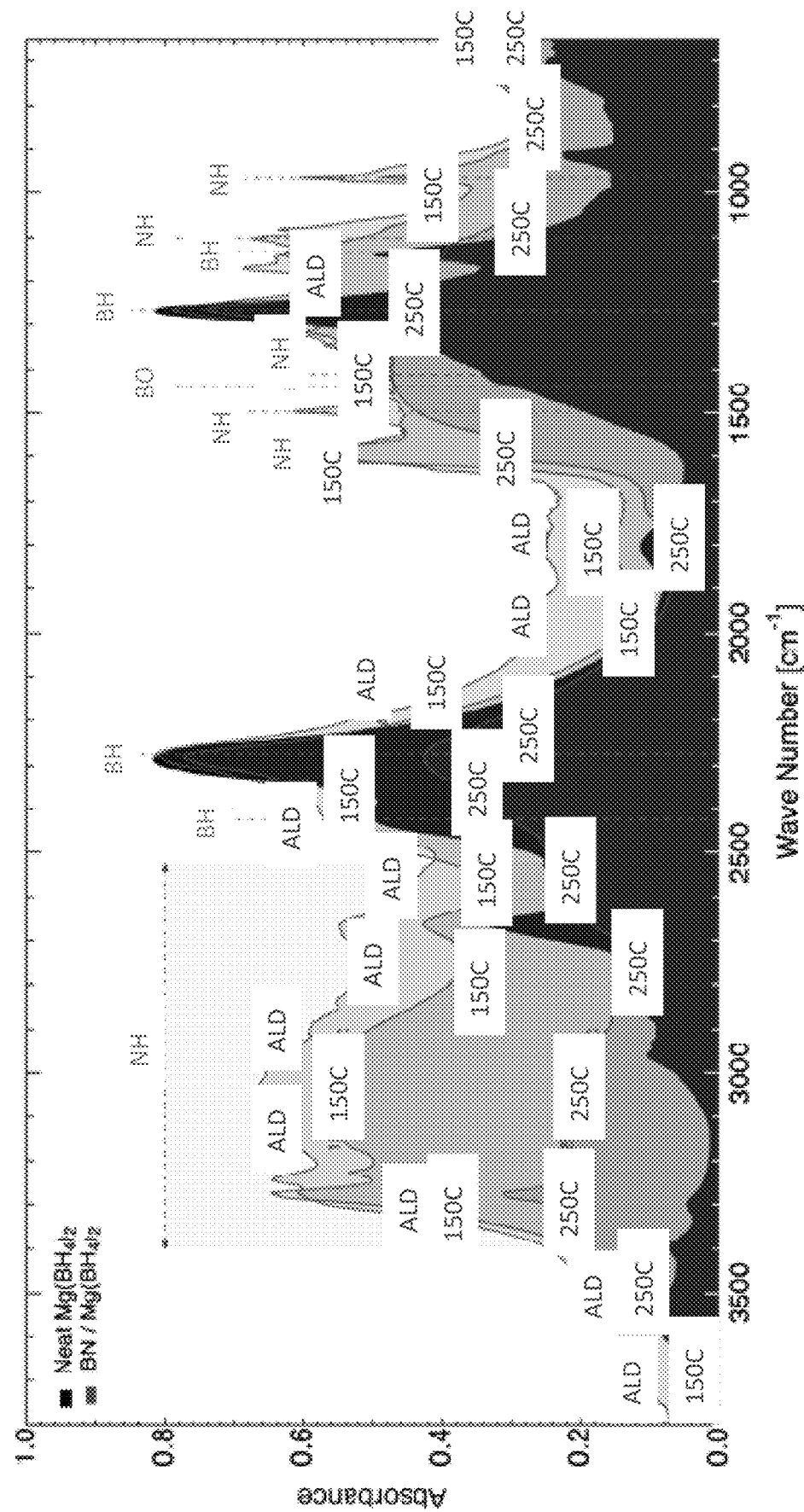
FIG. 6 provides infrared spectroscopy (IR) of ALD $BN/Mg(BH_4)_2$ after ALD, heated to 150° C. and 250° C. ALD of BN adds N—H and gives peaks similar to $N_2H_5Br$. Heating $BN/Mg(BH_4)_2$ concurrently drives off N—H and B—H. Supports $H_2$ formation and release via heterolytic cleavages of N—$H^{\delta+}$, B—$H^{\delta-}$. $AH^{\delta+} + XH^{\delta+} \rightarrow H_2 + AX$ FIG. 7 provides TPD for $NaBD_4$ and $NaBD_4$ mixed with $N_2H_5Cl$. Using deuterium (D)—in $NaBD_4$ (analog of NaBH$_4$). Mixed: NaBD$_4$+N$_2$H$_5$Cl (50:50). Strong hydrogen-deuterium (green) exchange at low T. Confirms mechanism: AH$^{\delta-}$+XH$^{\delta+}$→H$_2$+AX.
Figure 7:
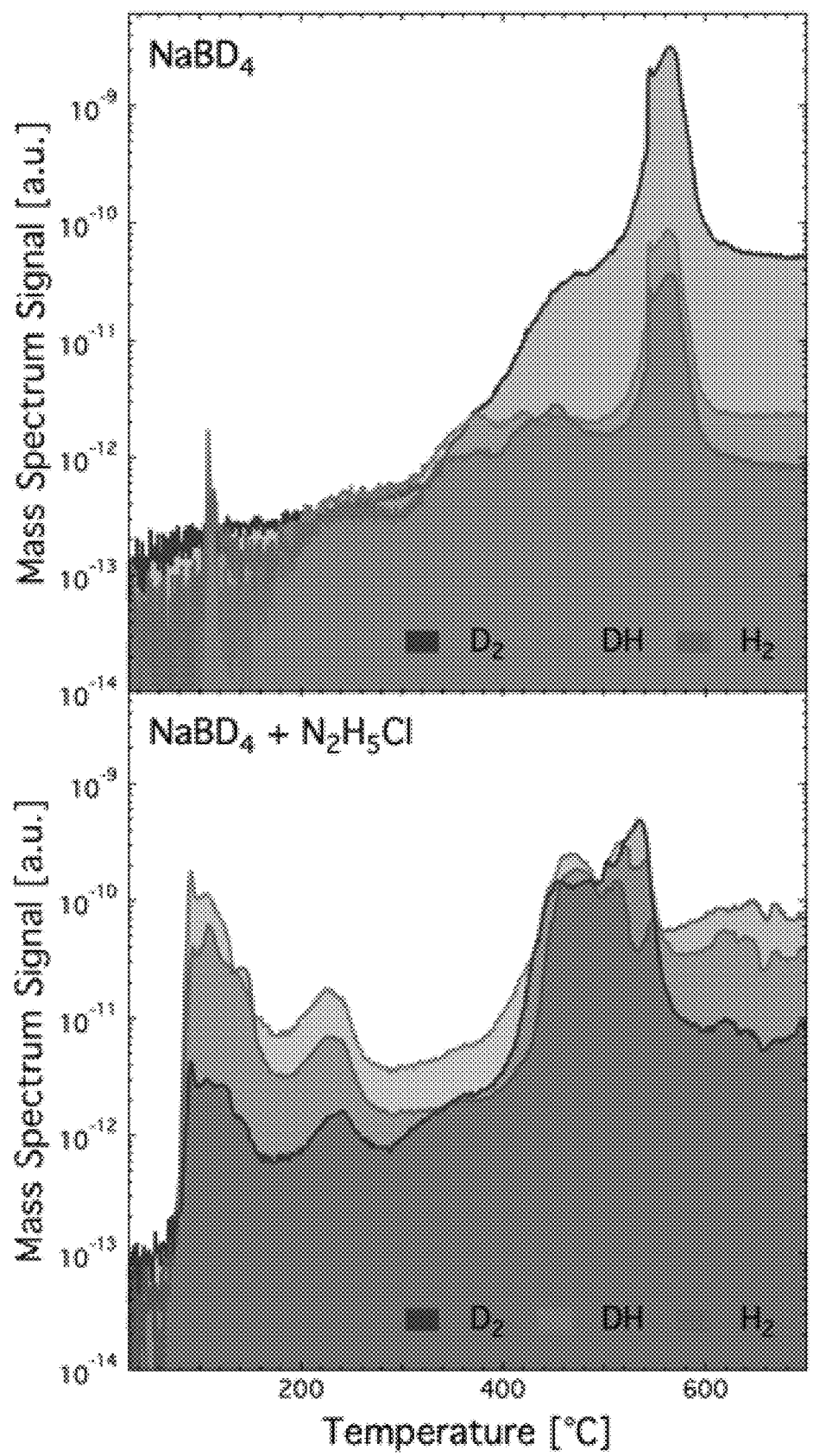
Figure 8:
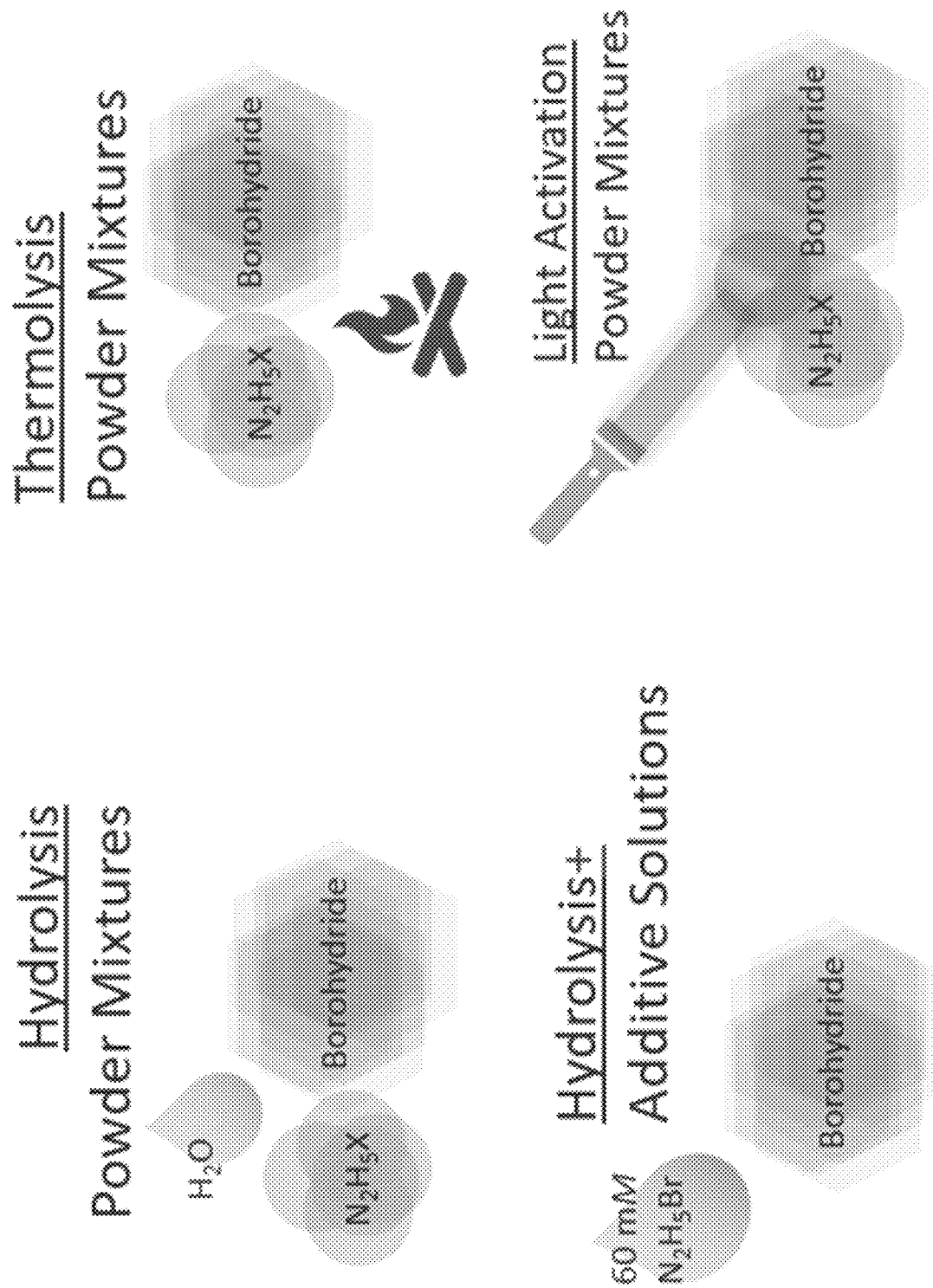
FIG. 8 illustrates the various methods of activation of hydrogen desorption described herein.
Figure 9:
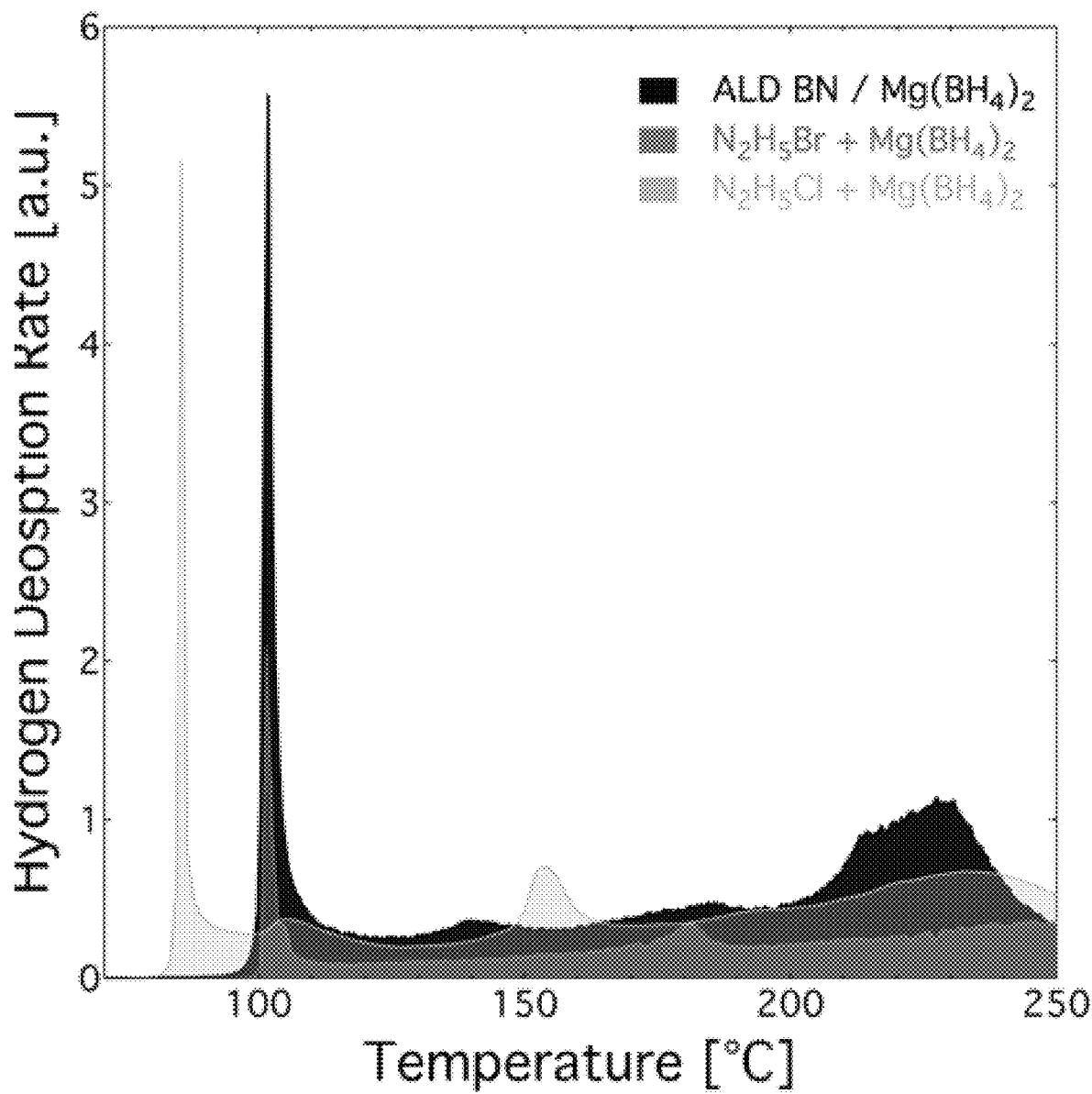
FIG. 9 provides temperature programmed desorption (TPD) for mixtures Mg(BH$_4$)$_2$+N$_2$H$_5$X, 5:1 respectively.
Figure 10:
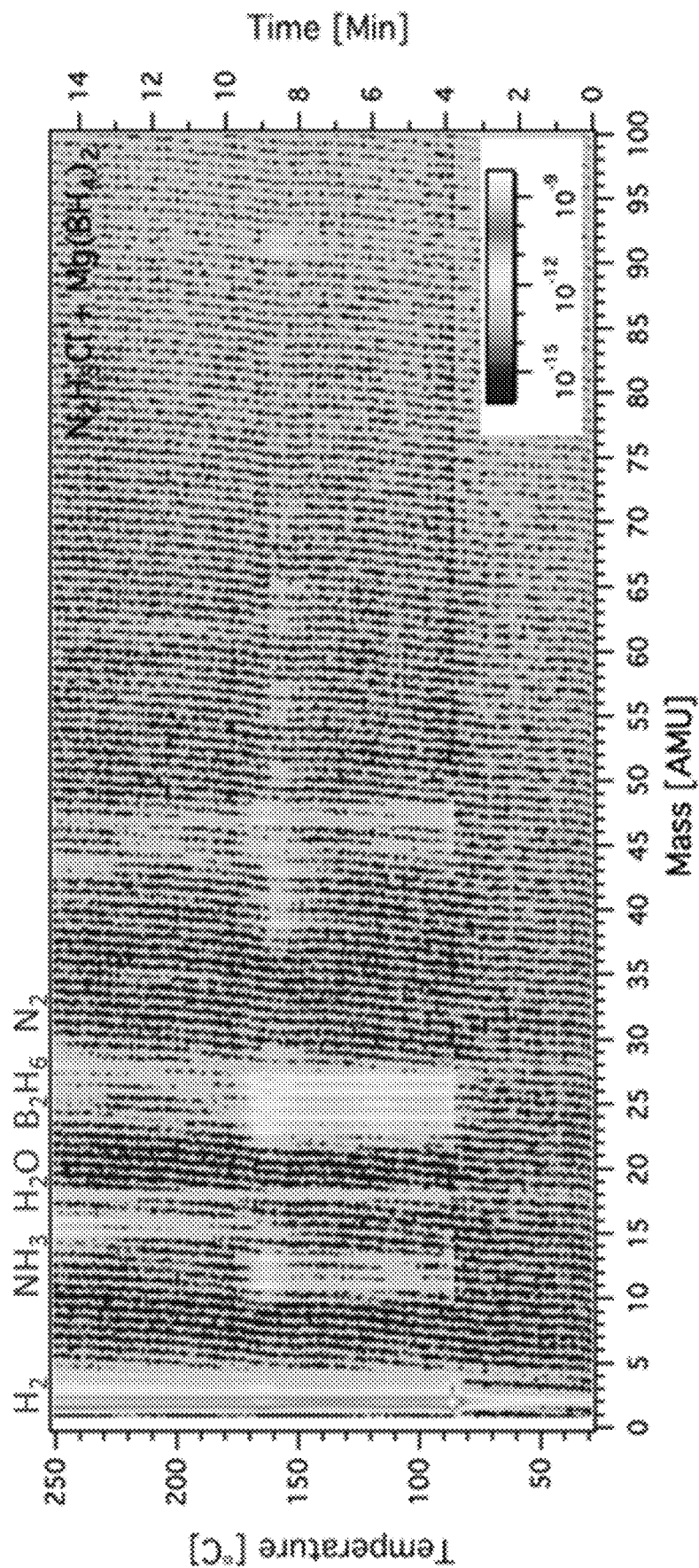
FIG. 10 provides mass spectrum for N$_2$H$_5$Cl+Mg(BH$_4$)$_2$—strong H$_2$ and some B$_2$H$_6$.
Figure 11:
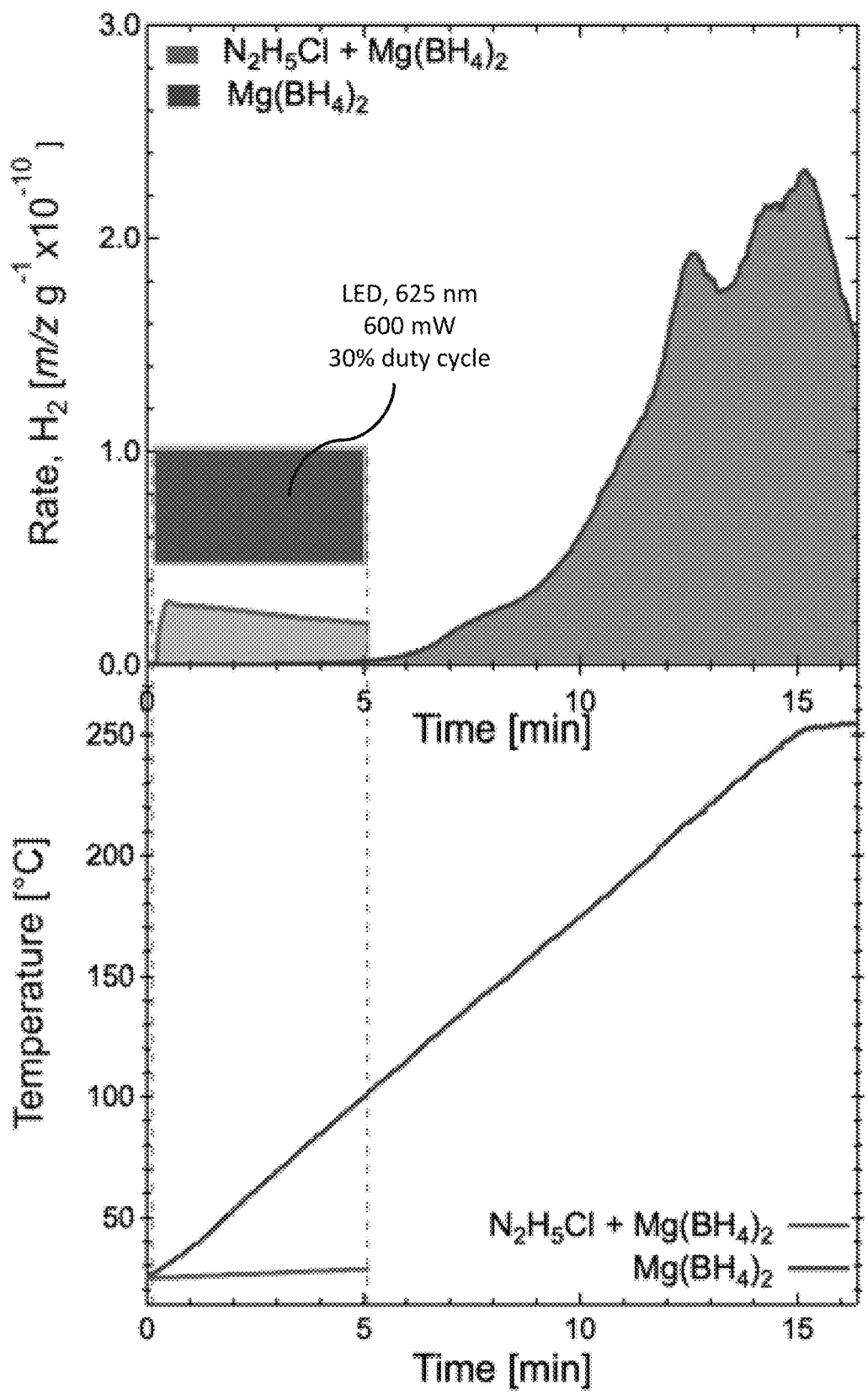
FIG. 11 illustrates light activated desorption for Mg(BH$_4$)$_2$+N$_2$H$_5$Cl and TPD for Mg(BH$_4$)$_2$.
Figure 12:
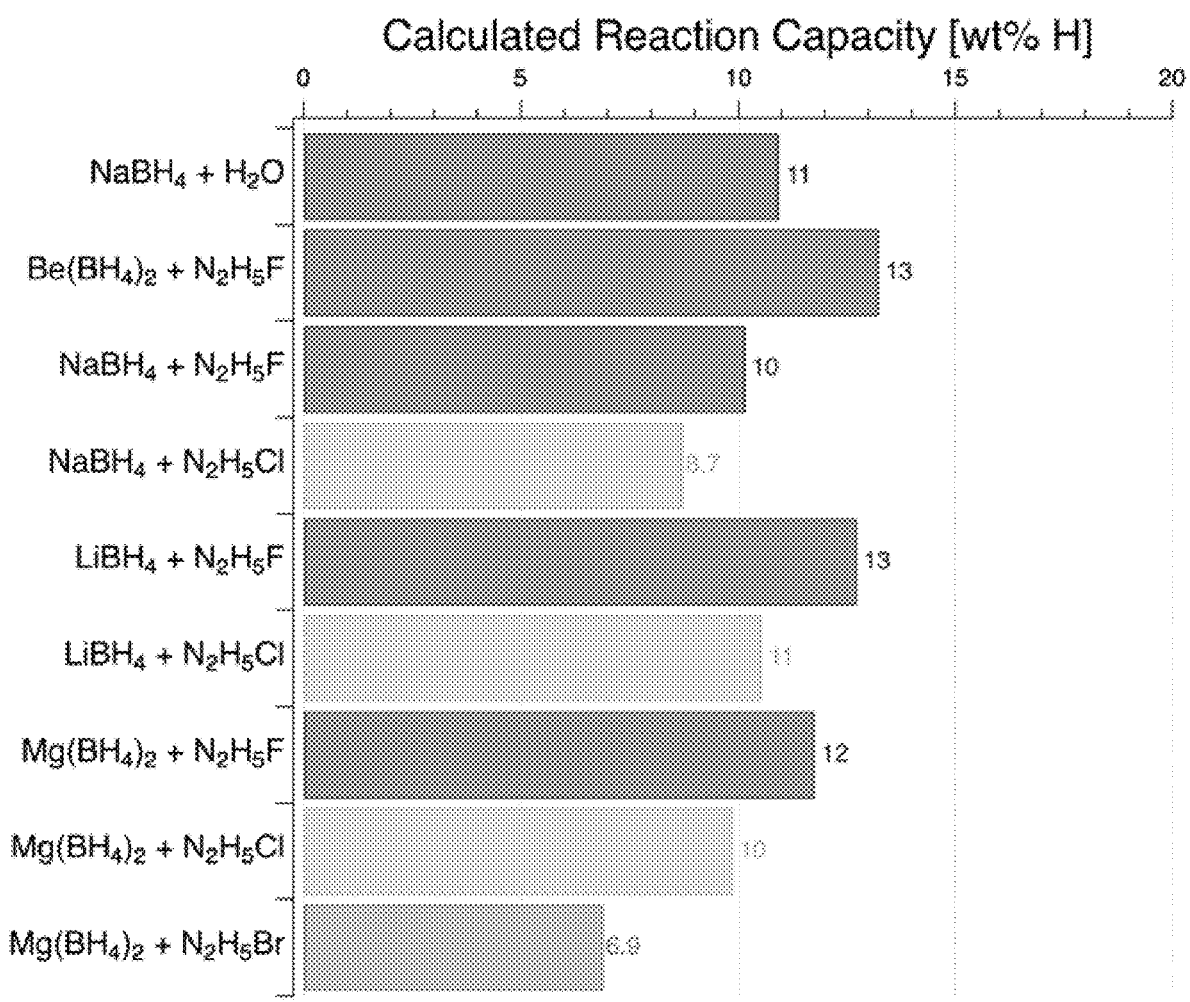
FIG. 12 described the specific energy and H$_2$ capacity of various embodiments described herein. Aviation prefers high specific energy.
Figure 13:
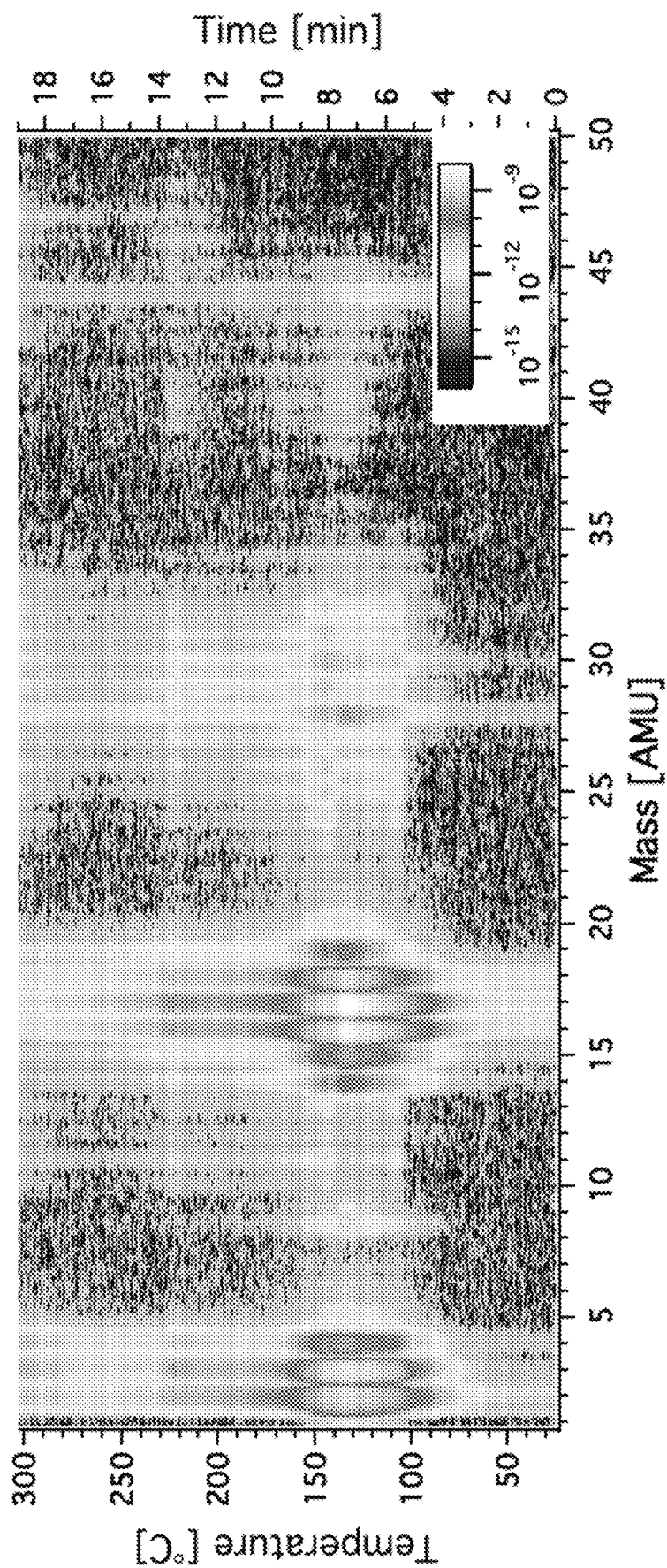
FIG. 13 provides mass spectrum for NH$_4$F which has a higher H$_2$ capacity than N$_2$H$_5$F. Releases HF, NH$_3$ and H$_2$; N$_2$H$_5$F releases more H$_2$ also.
Figure 14:
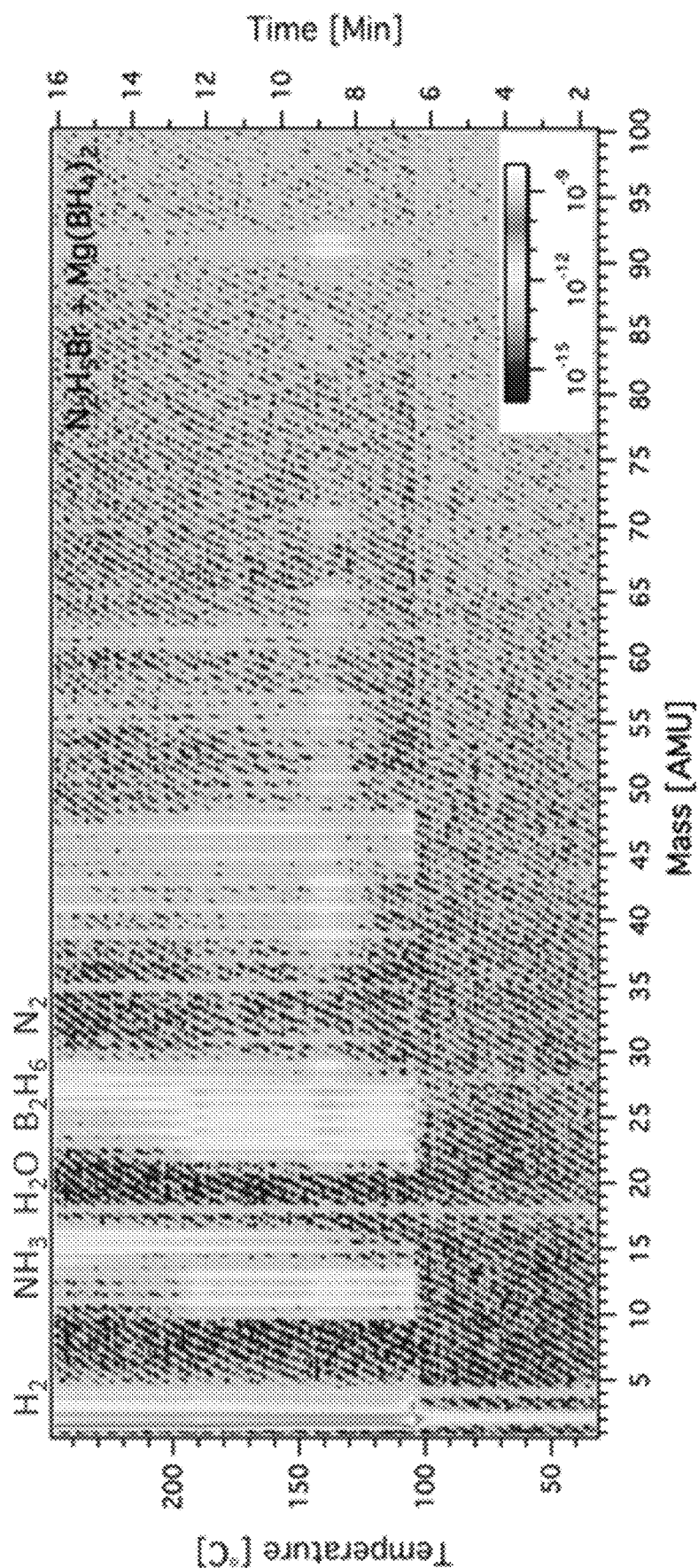
FIG. 14 provides mass spectrum for N$_2$H$_5$Br+Mg(BH$_4$)$_2$— strong H$_2$, more B$_2$H$_6$.
Figure 15:
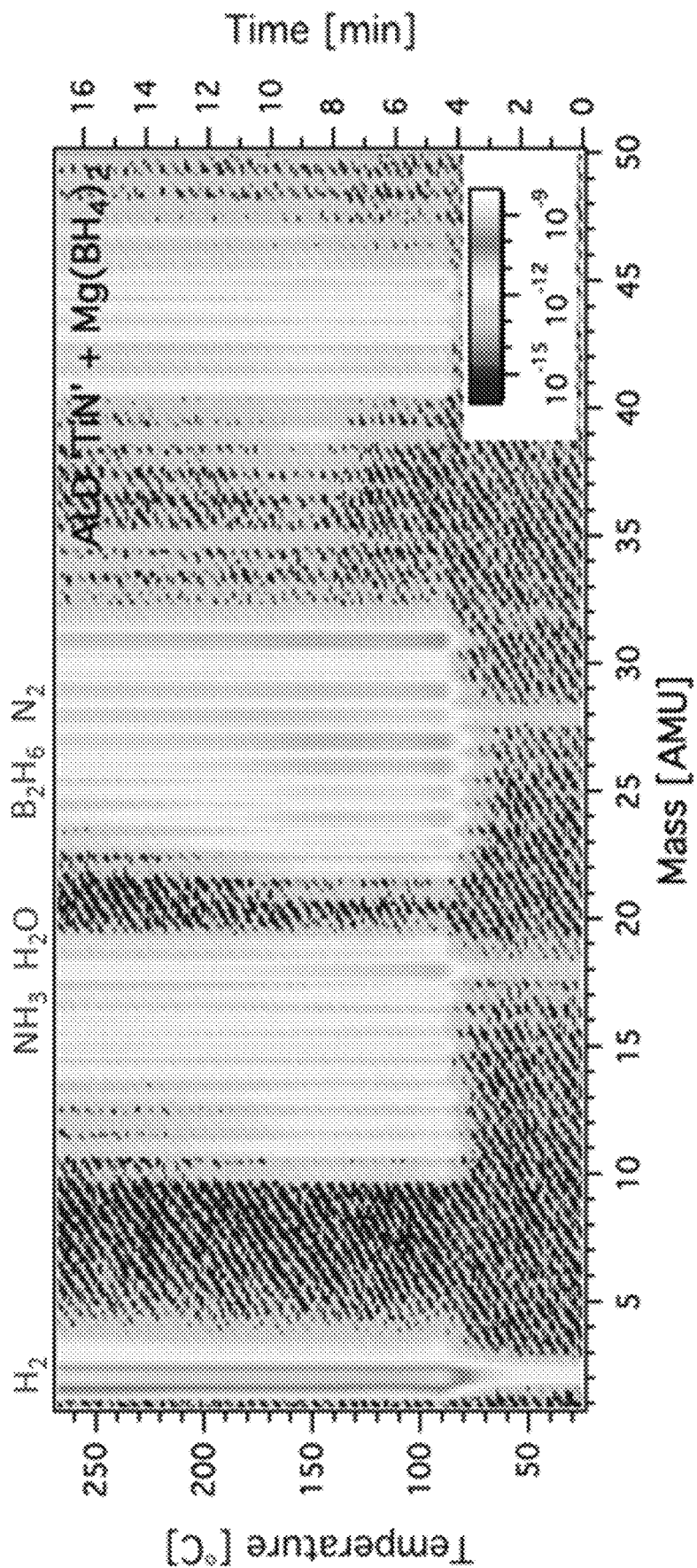
FIG. 15 provides mass spectrum for ALD TiN gives H$_2$ at 100° C., but lots of B$_2$H$_6$ and NH$_3$, N$_2$.
Figure 17:
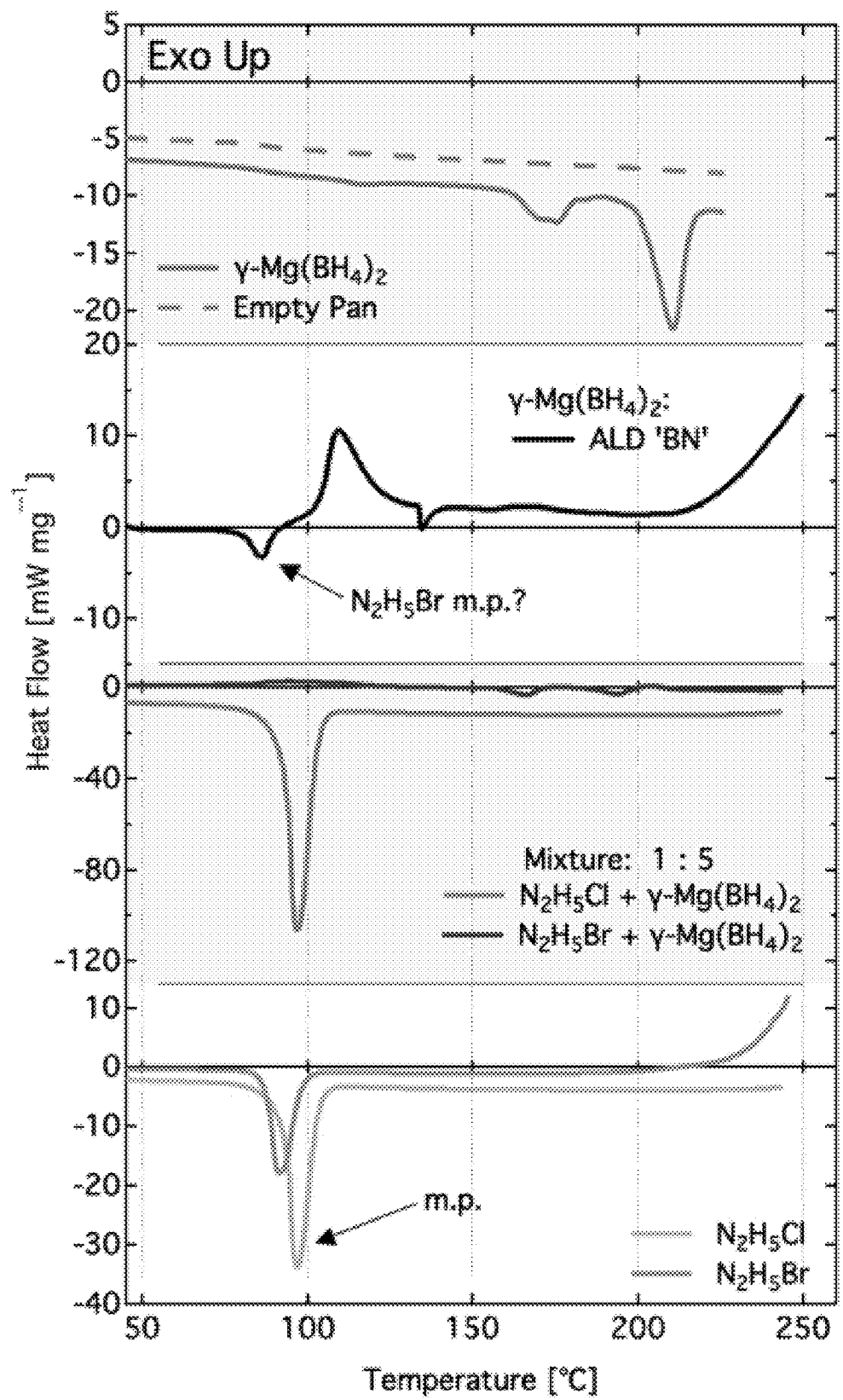
FIG. 17 provides melting point analysis for N$_2$H$_5$X using differential scanning calorimetry. ALD BN-Mg(BH$_4$)$_2$: Dip near 90° C., Strongly exothermic. N$_2$H$_5$X+Mg(BH$_4$)$_2$: Melting at 90° C., No exotherm. N$_2$H$_5$X Only: Melting at 90° C.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The provided discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

Example 1—Fuel Additives for Solid Transmogrification of Heterolytic Hydrogen (FASTH2)

For a molecule or compound bearing covalently bound hydrogen, the electronegativity of the atom bound to hydrogen produces a polarization of electric charge across the two species. Hydrogen bond cleavage is facilitated when hydrogen species bearing electropositive polarity is in close proximity to hydrogen bearing electronegative polarity. This bond cleavage is known as heterolytic fission or heterolysis and is described generally by:

$$A\text{-}H^{\delta+}+X\text{-}H^{\delta-}\rightarrow AX+H_2 \qquad [1],$$

where $^{\delta-}$ or $^{\delta+}$ describes hydrogen with an abundance or deficiency of electron density, respectively. A contributing factor to equation [1] is the thermodynamic driving force from the formation of the AX compound. Practical examples of this type of chemistry are hydrolysis of metal hydrides equation [2] or thermal decomposition (thermolysis) equation [3] of ammonia borane (NH$_3$BH$_3$), respectively:

$$2(H^{\delta+})_2O+NaB(H^{\delta-})_4\rightarrow 4H_2+NaBO_2 \qquad [2],$$

$$N(H^{\delta+})_3B(H^{\delta-})_3\rightarrow BN+3H_2 \qquad [3].$$

The AX products of these reactions, boron nitride (BN) or NaBO$_2$, are extremely stable compounds and are not useful for reversible hydrogen storage. Both reactions [2] and [3] are being considered for one-way hydrogen fuels for electric aviation powered by fuel cells. Hydrolysis via [2] reduces the specific energy density of the fuel and thermolysis of ammonia borane and similar chemicals can produce ammonia as a biproduct which contaminates the fuel.

A new class of chemical additives that use heterolysis of hydrogen with rapid dihydrogen ($H_2$) release was observed from heating magnesium borohydride, $Mg(BH_4)_2$, that had been coated and/or modified by vapor deposition process employing boron tribromide and hydrazine. The compound identified is hydrazinium bromide, $N_2H_5Br$, also known as hydrazine monohydrobromide. Hydrazinium bromide accumulated on $Mg(BH_4)_2$ as a product of the deposition process.

The hydrogen release process, or desorption, occurred at approximately 100° C., and resulted in 6.6% hydrogen by total sample weight desorbed. The desorption occurred in less than 10 seconds (data sampling rate was 10 s steps). The temperature, amount of hydrogen released, and rate are all performance results that could constitute a 'disruptive' technology. The rate alone is at least 100-fold greater than with no additive and may be one of the fastest known examples of hydrogen desorption. The low temperature is also of importance because many hydrogen storage applications with hydrides hit barriers due to desorption temperatures that are above 120° C. Subsequent investigations have identified temperatures as low as 85° C. for desorption. Heat transfer effects are likely the reason for observing temperatures above 120° C.

Analysis of the desorption products with mass spectrometry as a function of temperature show hydrogen, water, diborane, ammonia, nitrogen, and diborane. Hydrogen is the primary product, and the other products are released in concentrations 100-fold less than hydrogen at a minimum. The products are temperature dependent with hydrogen being released at the lowest temperature. The purity of the stream may be controlled through temperature.

Hydrazinium bromide and hydrazinium chloride ($N_2H_5Cl$) are both available commercially and manufactured for industry. Hydrazinium fluoride has been synthesized. Powders of $N_2H_5Cl$ and $N_2H_5Br$ were purchased from Millipore Sigma and mixed with $Mg(BH_4)_2$ and sodium borodeuteride ($NaBD_4$) which has hydrogen substituted with deuterium (D). These powder mixtures were heated and also resulted in rapid hydrogen desorption at similar temperatures. Furthermore, mixture of $NaBD_4$ and $N_2H_5Cl$ showed release of $H_2$, DH, and $D_2$ which is evidence of the heterolysis described above. Also, the use of $NaBD_4$ strongly suggests that the mechanism for hydrazinium halides, $N_2H_5X$ (X=Br, Cl, F), will operate generally with borohydrides and possible other complex hydrides. Furthermore, it is likely that $N_2H_5F$ will also produce the rapid desorption. Testing with $N_2H_5Br$ via vapor deposition on simple metal hydrides like magnesium hydride ($MgH_2$), titanium hydride ($TiH_2$), and calcium hydride ($CaH_2$) showed no activity. The melting of $N_2H_5Cl$ or $N_2H_5Br$ which occurs between 85-89° C. and thermal analysis of powder mixtures and vapor deposited materials indicates melting of the $N_2H_5X$ occurs immediately prior to desorption.

The compounds and methods described herein have the following benefits:

Hydrazinium compounds as solid hydrogen fuel additives: Hydrazinium halides, $N_2H_5X$ (X=Br, Cl, F), are the principle chemical additive that enable rapid hydrogen release that have not been heretofore identified as such. (Hereafter additive or chemical additive will refer to the hydrazinium halide) It has been confirmed for $N_2H_5Br$ and $N_2H_5Br$ and it is expected that $N_2H_5F$ will also show similar rapid hydrogen release with borohydrides. One benefit for $N_2H_5F$ would be to reduce the weight of the invention for vehicle and aircraft applications.

Formulations comprised of hydrazinium compounds and borohydrides: $Mg(BH_4)_2$, $LiBH_4$, $NaBH_4$ $NaBD_4$, and $Ca(BH_4)_2$ have both shown activity to the hydrazinium halides. It is expected that all metal borohydrides will have activity to the $N_2H_5X$ compounds. Additional borohydrides include $Ca(BH_4)_2$, tetramethylammonium borohydride, and sodium aluminum hydride. Borohydrides are complex hydrides and other examples of complex hydrides are sodium aluminum hydride ($NaAlH_4$, $Na_2AlH_6$) and lithium aluminum hydride ($LiAlH_4$, $Li_2AlH_6$) which also may show activity but also may not be ideal for weight. Formulations may be optimized for: total hydrogen content, specific energy (energy per mass) estimated from the lower heating value of hydrogen, efficiency of hydrogen release, temperature of the hydrogen release, purity of the fuel stream. The relevant fuel standards are SAE J2719 (See also ISO/PDTS 14687-2).

There are several other compositions that may be useful. As for chemical additives, in addition to the hydrazinium monohalides hydrazinium salts where the hydrazinium ion, $N_2H_5+$, bound to a negative ion like $OH^-$, $N_2H_5OH$. Hydrazinium dihalides may also have activity: $N_2H_6Cl_2$, $N_2H_6Br_2$, $N_2H_6F_2$. As for additional hydrides, $NaBH_4$, $LiBH_4$, $Mg(BH_4)_2$, $Y(BH_4)_3$, $Be(BH_4)_2$, $Ca(BH_4)_2$, $(CH_3)_4CNH_3BH_4$, $CH_3NH_3BH_4$, $NH_4BH_4$, $LiAlH_4$, $Li_2AlH_6$, $NaAlH_4$, $Na_2AlH_6$, and solid boranes ($B_xH_y$) may be useful in the compositions and methods described herein.

The particle sizes may be modified for specific applications, for example, the substrate may have a characteristic length or effective diameter selected from the range of 1 nm to 50 nm. Solvents may be used to deliver, synthesize, modify (including modifying to the liquid phase) the various compositions described herein.

The described compositions may be prepared via mechanical mixing, vapor deposition of $H_2N_5X$ on the hydride, or via solution chemistry. For mechanical mixing, mixtures of chemical additives and hydrides would be prepared by stirring, grinding, and/or other mechanical agitation of powders and/or fluids. For vapor deposition, the hydrazinium halide can be deposited directly on the borohydride with vapor deposition methods, including atomic layer deposition. The hydrazinium halide and/or hydride may also be prepared by solution chemistry.

Advantageously, the delivery and/or release of the hydrogen can be varied based on the formulation and additional factors, including:

a. Solid formulations, thermal activation: Powders of hydride-additive formulations can be heated to produce hydrogen release. Controlled release may be achieved by physical control of the hydride-additive or heating source.

b. Solid-liquid formulations: The hydride or chemical additive may be in liquid phase via a melt or dissolved in solution. Mixing of the solid and liquid components will result in hydrogen desorption. This is similar to hydrolysis-based technologies. Additional activation via heat, light, or electricity could also be employed.

c. Liquid-liquid formulations: The hydride or chemical additive are in liquid phase via a melt or dissolved in solution. Mixing of the liquids will result in hydrogen desorption. Additional activation via heat, light, or electricity could also be employed.

d. Light activation: Hydride-additive formulations described herein will release hydrogen through lightstimulated processes. This could include interactions that involve absorption of light, plasmonic mechanisms, thermal effects due to light, or other related processes. Additional media maybe be used to enhance the light activation which includes but is not limited to: plasmonic materials, chemiluminescent materials, dyes, fluorescent materials, etc.

e. Electrical activation: Hydride-additive formulations described herein will release hydrogen through electrical-stimulated processes. This includes but is not limited to: direct electrical contact, electrochemical, etc.

The compositions and methods described herein may be further understood by the following non-limiting examples:

Example 1. A composition for storing and delivering hydrogen comprising:
a substrate comprising at least one of a borohydride or an alkali aluminum hydride; and
a first coating in physical communication with the substrate, wherein:
the first coating comprises a hydrazinium halide having the formula $N_2H_5X$,
X comprises a halogen, and
the composition is capable of generating hydrogen ($H_2$) when treated with at least one of an elevated temperature, exposure to light, or exposure to electrical energy.

Example 2. The composition of example 1, wherein the substrate is a metal borohydride comprising at least one of $NaBH_4$, $LiBH_4$, $Mg(BH_4)_2$, $Y(BH_4)_3$, $Be(BH_4)_2$, or $Ca(BH_4)_2$.

Example 3. The composition of example 1, wherein the substrate is a borohydride comprising at least one of $(CH_3)_4CNH_3BH_4$, $CH_3NH_3BH_4$, $NH_4BH_4$, or a solid borane ($B_xH_y$).

Example 4. The composition of example 1, wherein the substrate is an alkali aluminum hydride comprising at least one of $LiAlH_4$, $Li_2AlH_6$, $NaAlH_4$, or $Na_2AlH_6$.

Example 5. The composition of any of examples 1-4, wherein X is at least one of Br or Cl.

Example 6. The composition of any of examples 1-5, further comprising a light-absorbing material.

Example 7. The composition of example 6, wherein the light-absorbing material comprises at least one of a nitride or gold.

Example 8. The composition of example 6 or 7, wherein the light-absorbing material is randomly mixed within at least one of the substrate or the first coating.

Example 9. The composition of example 6 or 7, wherein the light absorbing material is present as a second coating in physical communication with the first coating.

Example 10. The composition of any of examples 6-9, wherein the light-absorbing material and the first coating are at a ratio between about 1:10 and about 1:100.

Example 11. The composition of any of examples 6-10, wherein the light-absorbing material is capable of absorbing light having a wavelength between about 300 nm and about 1200 nm.

Example 12. The composition of any of examples 6-11, wherein:
the light-absorbing material comprises a composition defined by $A_xN_{1-x}$,
N is nitrogen, A comprises at least one of titanium, zirconium, or niobium, and $0 \leq x \leq 1$.

Example 13. The composition of any of examples 1-5, wherein the elevated temperature is between about 1° C. and about 500° C.

Example 14. The composition of any of examples 1-5, wherein the composition to the exposure to electrical energy is performed by at least of one of direct electrical contact or electrochemical current generation.

Example 15. The composition of any of examples 1-14, wherein the composition comprises a liquid at temperatures less than or equal to 100° C.

Example 16. The composition example 15, wherein the liquid is generated by at least one of melting the composition or dissolving the composition in a solution.

Example 17. The composition of any of examples 1-16, wherein the composition is a fuel additive.

Example 18. The composition of any of examples 1-17, wherein the substrate is reusable by reapplying the coating after hydrogen has been generated.

Example 19. A method for storing and delivering hydrogen comprising:
providing a borohydride or an alkali aluminum hydride substrate;
applying a first coating comprising a hydrazinium halide and having the formula $N_2H_5X$, wherein X is F, Cl, Br or I, thereby generating a hydrogen storage composition;
wherein the hydrogen storage composition is capable of generating hydrogen ($H_2$) when treat to at least one of an elevated temperature, exposure to light or exposure to electrical energy.

Example 20. The method of example 19, wherein the step of applying a coating comprises depositing a mixture of hydrazine and a borohalide, thereby generating a hydrazinium halide.

Example 21. The method of example 20, wherein the borohalide comprises at least one of boron trifluoride, boron trichloride, boron tribromide or boron triiodide.

Example 22. The method of any of examples 19-21, wherein the step of applying comprises mechanical mixing of substrate and the coating.

Example 23. The method of any of examples 19-21, wherein the step of applying comprises using physical vapor deposition to apply the coating to the substrate.

Example 24. The method of example 23, wherein the step of applying comprises using atomic layer deposition to apply the coating to the substrate.

Example 25. The method of any of examples 19-21, wherein the step of applying comprises using solution chemistry to apply the coating to the substrate.

Example 26. The method of any of examples 19-25 further comprising generating hydrogen gas by treating the hydrogen containing composition with an elevated temperature, light or electrical energy.

Example 26. The method of any of examples 18-25, wherein the substrate is a metal borohydride comprising at least one of $NaBH_4$, $LiBH_4$, $Mg(BH_4)_2$, $Y(BH_4)_3$, $Be(BH_4)_2$, or $Ca(BH_4)_2$.

Example 27. The method of any of examples 18-25, wherein the substrate is a borohydride comprising at least one of $(CH_3)_4CNH_3BH_4$, $CH_3NH_3BH_4$, $NH_4BH_4$ or a solid borane ($B_xH_y$).

Example 28. The method of any of examples 18-25, wherein the substrate is an alkali aluminum hydride comprising at least one of $LiAlH_4$, $Li_2AlH_6$, $NaAlH_4$ or $Na_2AlH_6$.

Example 29. The method of any of examples 18-28, wherein X is at least one of Br or Cl.

Example 30. A composition for storing and delivering hydrogen comprising:
a substrate and coating comprising magnesium hydrazinidoborane ($Mg(N_2H_3BH_3)_2$); and
the composition is capable of generating hydrogen ($H_2$) when treated with at least one of an elevated temperature, exposure to light, or exposure to electrical energy.

Example 31. A method for storing a delivering hydrogen comprising:
providing a borohydride substrate;
applying a first coating comprising a hydrazinium halide and having the formula $N_2H_5X$, wherein X is F, Cl, Br or I, thereby generating a hydrogen storage composition;
wherein the hydrogen storage composition is capable of generating hydrogen ($H_2$) when treat to at least one of an elevated temperature, exposure to light or exposure to electrical energy.

Example 32. The method of example 31, wherein the hydrogen storage composition is a hydrazinium halide.

Example 33. The method of example 31, wherein the hydrogen storage composition is magnesium hydrazinidoborane ($Mg(N_2H_3BH_3)_2$).

Example 34. The method of any of examples 31-33, wherein the borohalide substrate comprises boron trifluoride, boron trichloride, boron tribromide or boron triiodide.

Example 35. The method of any of examples 31-34, wherein the step of applying the first coating comprises mechanically mixing the substrate and the first coating.

Example 36. The method of any of examples 31-34, wherein the step of applying the first coating comprises using physical vapor deposition to deposit the first coating on the substrate.

Example 37. The method of any of examples 31-34, wherein the step of applying the first coating comprises using atomic vapor deposition to deposit the first coating on the substrate.

Example 38. The method of any of examples 31-34, wherein the step of applying the first coating comprises using solution chemistry to deposit the first coating on the substrate.

Example 39. The method of any examples 31-38 further comprising:
treating the hydrogen storage composition with an elevated temperature, light, or electrical energy, thereby generating hydrogen gas.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every formulation or combination of components described or exemplified herein can be used to practice the invention, unless otherwise stated.

Whenever a range is given in the specification, for example, a density range, a number range, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A composition for storing and delivering hydrogen comprising:
    a substrate comprising at least one of a borohydride or an alkali aluminum hydride; and
    a first coating in physical communication with the substrate, wherein:
    the first coating comprises a hydrazinium halide having the formula $N_2H_5X$,
    X comprises a halogen,
    a light absorbing material comprising gold; and
    the composition is capable of generating hydrogen ($H_2$) when treated with at least one of an elevated temperature, exposure to light, or exposure to electrical energy.

2. The composition of claim 1, wherein the substrate is a metal borohydride comprising at least one of $NaBH_4$, $LiBH_4$, $Mg(BH_4)_2$, $Y(BH_4)_3$, $Be(BH_4)_2$, or $Ca(BH_4)_2$.

3. The composition of claim 1, wherein the substrate is a borohydride comprising at least one of $(CH_3)_4CNH_3BH_4$, $CH_3NH_3BH_4$, $NH_4BH_4$, or a solid borane ($B_xH_y$).

4. The composition of claim 1, wherein the substrate is an alkali aluminum hydride comprising at least one of $LiAlH_4$, $Li_2AlH_6$, $NaAlH_4$, or $Na_2AlH_6$.

5. The composition of claim 1, wherein X is at least one of Br or Cl.

6. The composition of claim 1, wherein the light-absorbing material is randomly mixed within at least one of the substrate or the first coating.

7. The composition of claim 1, wherein the light absorbing material is present as a second coating in physical communication with the first coating.

8. The composition of claim 1, wherein the light-absorbing material and the first coating are at a ratio between about 1:10 and about 1:100.

9. The composition of claim 1, wherein the light-absorbing material is capable of absorbing light having a wavelength between about 300 nm and about 1200 nm.

10. The composition of claim 1, wherein the elevated temperature is between about 1° C. and about 500° C.

11. The composition of claim 1, wherein the composition to the exposure to electrical energy is performed by at least of one of direct electrical contact or electrochemical current generation.

12. The composition of claim 1, wherein the composition comprises a liquid at temperatures less than or equal to 100° C.

13. The composition claim 12, wherein the liquid is generated by at least one of melting the composition or dissolving the composition in a solution.

14. The composition of claim 1, wherein the composition is a fuel additive.

15. The composition of claim 1, wherein the substrate is reusable by reapplying the coating after hydrogen has been generated.

* * * * *